Figure 1:
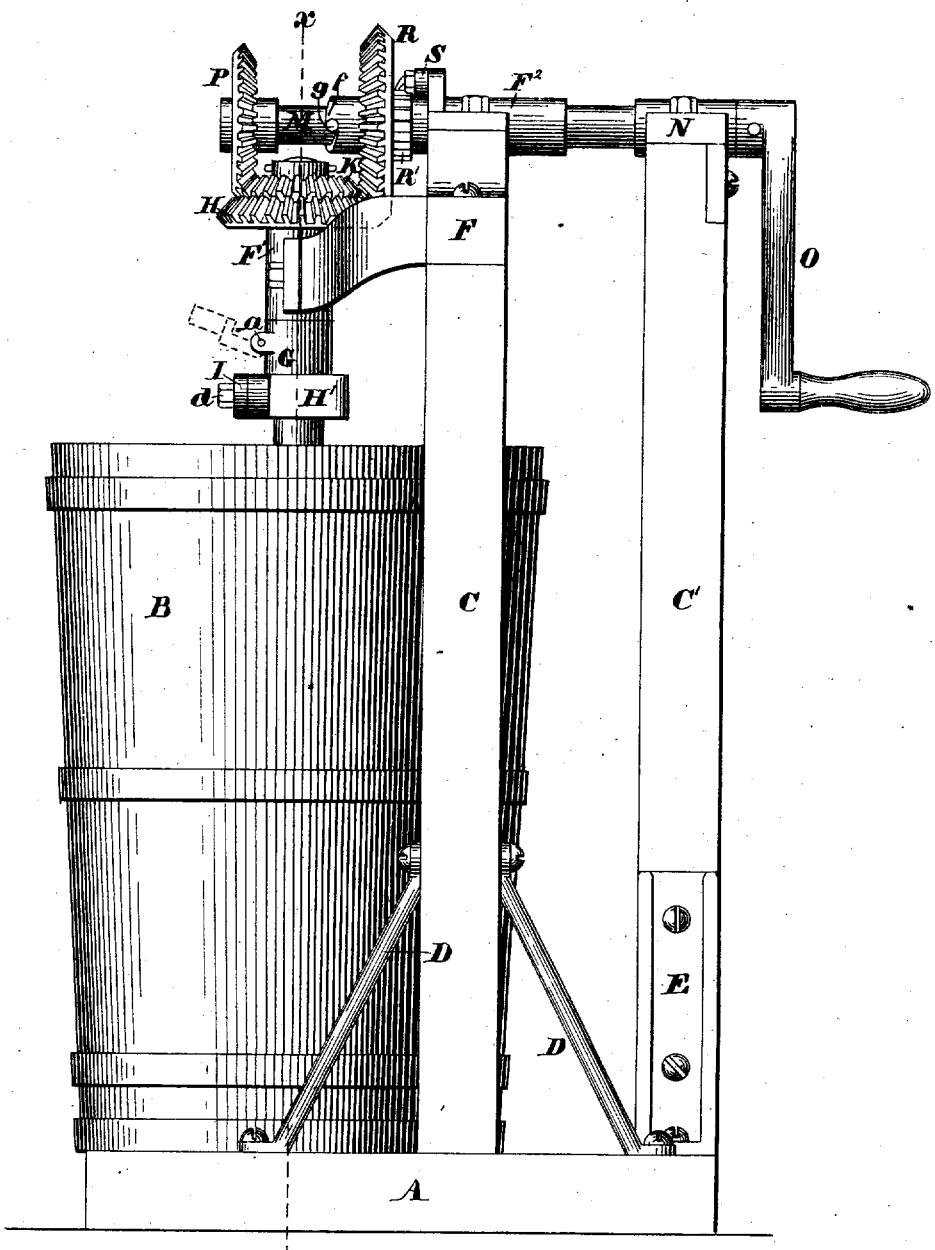

J. DOOLING.

Ice Cream Freezer.

No. 9,668. Reissued April 19, 1881.

Witnesses:
E. A. Heinmenway.
Walter E. Lombard.

Inventor:
James Dooling
by N. E. Lombard
Attorney.

N. PETERS, PHOTO-LITHOGRAPHER, WASHINGTON, D. C.

J. DOOLING.

Ice Cream Freezer.

No. 9,668. Reissued April 19, 1881.

Witnesses:
E. A. Hemmenway
Walter E. Lombard.

Inventor:
James Dooling
by N. C. Lombard
Attorney.

N. PETERS, PHOTO-LITHOGRAPHER, WASHINGTON, D. C.

J. DOOLING.

Ice Cream Freezer.

No. 9,668. Reissued April 19, 1881.

Witnesses:

E. A. Hemmenway

Walter C. Lombard

Inventor:

James Dooling by N. C. Lombard

Attorney.

N. PETERS, PHOTO-LITHOGRAPHER, WASHINGTON, D. C.

UNITED STATES PATENT OFFICE.

JAMES DOOLING, OF BOSTON, MASSACHUSETTS.

ICE-CREAM FREEZER.

SPECIFICATION forming part of Reissued Letters Patent No. 9,668, dated April 19, 1881.

Original No. 180,422, dated August 1, 1876. Application for reissue filed March 17, 1881.

*To all whom it may concern:*

Be it known that I, JAMES DOOLING, of Boston, in the county of Suffolk and State of Massachusetts, have invented certain new and useful Improvements in Ice-Cream Freezers, of which the following, taken in connection with the accompanying drawings, is a specification.

My invention relates to the arrangement of the gearing for operating the beater and cream-holder and the manner of controlling their motions; and it consists, first, in a special arrangement of the operating-gears, the coupling-spindle and sleeve-shaft, and the bearings for supporting the same, which will be best understood in connection with the description of the drawings.

My invention further consists in the use of a square or other flat-sided socket to embrace a correspondingly-shaped hub on the cover of of the cream-holder, said socket being made open upon one side to allow of the reception of the hub of the cream-holder, said open side being closed by a hinged gate pivoted to said socket so as to swing outward and upward, or vice versa, about an axis at right angles to the axis of the socket, and a latch pivoted at one side of said gate to the main body of the socket and adapted to engage with a headed pin set in said socket upon the other side of said gate; or the gate in certain cases may be dispensed with and the latch only be used, as will be described.

My invention further consists in fitting the bevel-gear on the driving-shaft, which imparts motion to the cream-holder in such a manner that the driving-shaft may revolve freely therein, if desired, in combination with a pin fitted to a hole in said driving-shaft and adapted to engage with one or more teeth formed on the end of the hub of said gear and compel it to revolve with the driving-shaft.

My invention further consists in the use of a ratchet-wheel formed upon or secured to said gear, in combination with a pawl pivoted to some portion of the stationary frame and adapted to engage with said ratchet to prevent the cream-holder from being revolved by the revolution of the beater through the stiff cream when the driving-gear on the driving-shaft is uncoupled therefrom.

Figure 2:
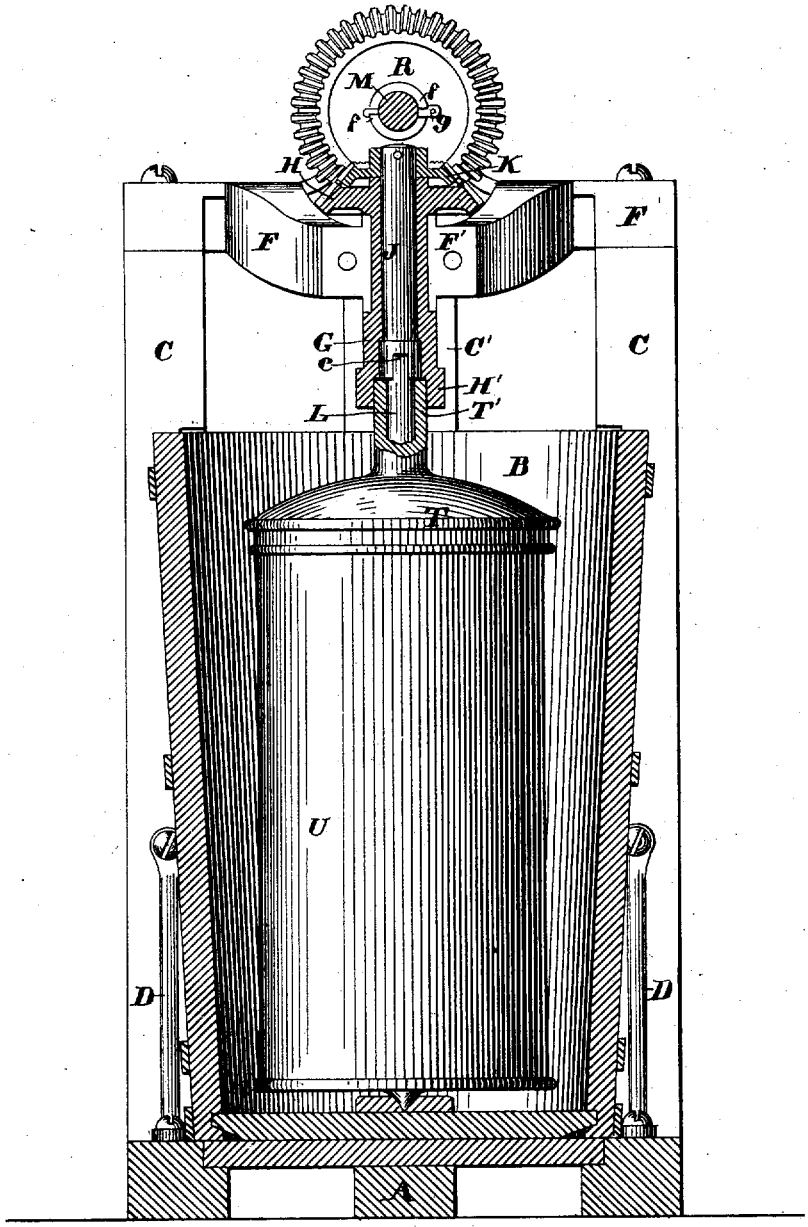
Figure 3:
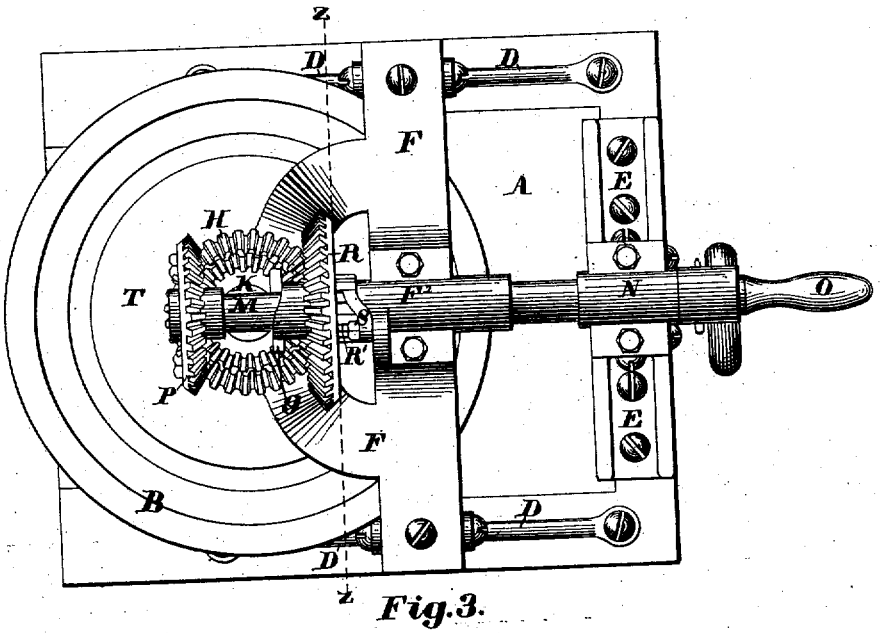
Figure 5:
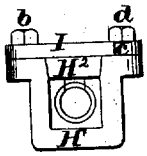
Figure 10:
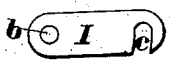
Figure 11:
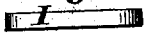
Figure 8:
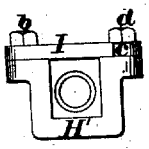
Figure 4:
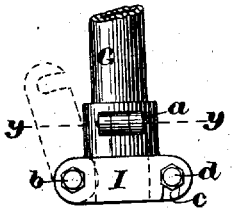
Figure 12:
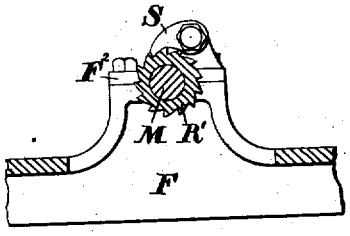
Figure 7:
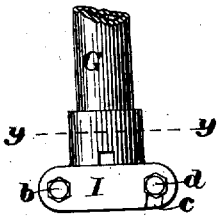
Figure 6:
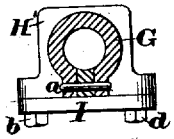
Figure 9:
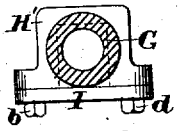

Figure 1 of the drawings is a side elevation of a machine embodying my invention. Fig. 2 is a vertical section on line *x x* on Fig. 1. Fig. 3 is a plan. Fig. 4 is a front elevation of a portion of the sleeve-shaft and the socket for coupling to the cream-holder. Figs. 5 and 6 are respectively an inverted plan of same and a section on line *y y* on Fig. 4. Figs. 7, 8, and 9 illustrate a modification of the coupling-socket. Figs. 10 and 11 are respectively an elevation and plan of the coupling-latch; and Fig. 12 is a partial section on line *z z* on Fig. 3, showing the ratchet and pawl for holding the cream-holder in a state of rest.

A is the platform, upon which the ice-tank B is placed when in connection with the driving mechanism.

C and C′ are the standards erected upon the platform A, and securely attached thereto by the braces D D and angle-irons E.

F is a metallic frame secured to the tops of the standards C, and provided with the boxes F′ and F². In the box F′ is mounted the hollow shaft or sleeve G, upon the upper end of which is cast or otherwise secured the bevel-gear wheel H, and upon the other end a square socket, H′, one side of which is made in a detached or separate piece, H², and hinged to the main body of the socket, so that it may be swung outward and upward about an axial pin at right angles to the axis of the socket, as shown at *a*, Figs. 1, 4, and 6.

I is a latch, pivoted to the main body of the socket at *b*, and provided with a slot, *c*, at the other end, which engages with the headed pin *d*, also set in the main body of the socket when the latch is thrown into a horizontal position, as shown in Fig. 4. By swinging the latch I upward, as shown in dotted lines in Fig. 4, the gate or hinged portion of the socket H² may be swung outward and upward into the position shown in dotted lines in Fig. 1, when the ice-tank B and contents may be removed from beneath the driving mechanism for the purpose of removing the frozen cream and refilling the cream-holder.

J is a spindle having its bearing in the sleeve-shaft G, in which it is free to revolve, and having secured to its upper end, immediately above the gear-wheel H, the bevel-gear wheel K, having a diameter at its large end about equal to the diameter of the gear H at its small end. The gear K is firmly secured to the spindle J, with its hub resting on the upper end of the sleeve-shaft G, as shown in Fig. 2. The spindle J has cut across its lower end a slot, *e*, to receive the flattened upper end of the beater-shaft L, as shown in Fig. 2.

M is the driving-shaft, mounted in a horizontal position in the box $F^2$ on the frame F and the box N secured to the upper end of the standard C′, and has secured to its rear end the crank O, by means of which, or a pulley and belt which may be substituted for said crank, a rotary motion may be imparted thereto. The shaft M also has firmly secured to its extreme front end the bevel-gear wheel P, which meshes into and imparts motion to the gear-wheel K, and through it to the spindle J.

R is a bevel-gear wheel fitted loosely upon the shaft M, so as to revolve freely thereon, and having one or two teeth, *f*, formed upon the end of its hub, adapted to engage with the pin *g* inserted through the shaft M, as shown in Fig. 1. The gear R meshes into and imparts motion to the gear-wheel H on the upper end of the sleeve-shaft G, acting upon said gear upon the side opposite the point where the gear-wheel P meshes into the gear K, in such a manner that a revolution of the driving-shaft will cause the gears H and K to revolve in opposite directions. The gear R has formed upon its hub or secured thereto a series of ratchet-teeth, R′, with which a pawl, S, pivoted to the cap of box $F^2$, engages, when desired, to prevent the gears R and H and the cream-holder from being revolved by the revolution of the beater through the stiff cream when the pin *g* is withdrawn from the shaft M to allow the shaft to revolve without revolving the gears R and H.

In Figs. 7, 8, and 9 is shown a modification of the coupling-socket, in which the gate $H^2$ is dispensed with, the latch I being so arranged as to form one side of the socket, and requiring only to swing the latch upward to open the socket for the reception or withdrawal of the square or flat sided hub T′ of the cream-holder cover T.

U is the cream-holder, constructed and pivoted in the ice-tank B in a well-known manner, and containing a beater, also constructed in a well-known manner.

I do not claim, broadly, a coupling-socket made in two parts hinged together, as such a device is described in Letters Patent No. 141,209, granted to me July 29, 1873; neither do I claim, broadly, four bevel gears arranged to impart rotary motion in opposite directions to a beater and cream-holder, for I am aware that such a device is described in Letters Patent No. 49,797, granted to J. S. Shattuck, September 5, 1865; but

What I claim as new, and desire to secure by Letters Patent of the United States, is—

1. The combination, in an ice-cream freezer, of the bevel-gear wheels H, K, P, and R, bearing F, located below the gears, the spindle J, and the sleeve-shaft G, provided at its lower end with a socket, made in two parts hinged together, and adapted to engage with the hub on the cream-holder cover without vertical movement of the cream-holder or the sleeve-shaft, as and for the purposes described.

2. The sleeve-shaft G, having formed on its lower end a square or flat-sided socket with one side open, and provided with a latch, I, pivoted thereto by one end, and having a slot, *e*, in its other end, to engage with a headed pin to close and form one side of the socket, as and for the purposes described.

3. The sleeve-shaft G, having formed in its lower end a square or flat-sided socket with one side open, and having fitted to said open side the gate $H^2$, pivoted to said sleeve by an axial pin placed at right angles to the axis of the socket, but in a different plane, and swinging outward from the axis of the socket and upward to open said socket, in combination with the latch I to lock said gate in position, substantially as described.

4. The bevel-gear wheel R, fitted loosely upon the shaft M, and provided with one or more teeth or shoulders, *f*, formed upon the end of its hub, in combination with the removable pin *g*, set in the shaft M in a position to engage with said teeth or shoulders *f*, as and for the purposes described.

5. The gear R, provided with the teeth *f* and ratchet R′, and fitted loosely upon the shaft M, in combination with the pin *g* and pawl S to engage with said ratchet, as and for the purposes described.

6. The combination of a cream-can, a beater, a bevel-gear wheel secured to the beater-shaft, a bevel-gear wheel connected with the can or can-cover, a horizontal driving-shaft having mounted thereon two bevel-gear wheels which engage, respectively, with the gear on the beater-shaft and the gear on the can, means of readily coupling to or uncoupling from said horizontal shaft one of said gears at will, and means of locking the can to prevent its revolution, for the purposes described.

7. The alternately-operating bevel-gear wheel R, mounted upon the constantly-operating shaft M, in combination with the bevel-gear wheel H and the can U, when so arranged as to alternately operate said gear and can and allow them to remain in a state of rest, for the purposes specified.

Executed at Boston, Massachusetts, this 14th day of March, 1881.

JAMES DOOLING.

Witnesses:
E. A. HEMMENWAY,
WALTER E. LOMBARD.